(12) United States Patent
Ma et al.

(10) Patent No.: US 12,229,029 B2
(45) Date of Patent: Feb. 18, 2025

(54) APPARATUS AND METHOD FOR TESTING HIGH-SPEED LOW-LATENCY INTERCONNECT INTERFACE (HLII) FOR SILICON INTERPOSER (71) Applicant: WUXI ESIONTECH CO., LTD., Wuxi (CN)

(72) Inventors: Xiaojie Ma, Wuxi (CN); Xiaochen Hu, Wuxi (CN); Yanfeng Xu, Wuxi (CN); Yuting Xu, Wuxi (CN); Yanfei Zhang, Wuxi (CN); Yueer Shan, Wuxi (CN)

(73) Assignee: WUXI ESIONTECH CO., LTD., Wuxi (CN)

( * ) Notice: Subject to any disclaimer, the term of this patent is extended or adjusted under 35 U.S.C. 154(b) by 88 days.

(21) Appl. No.: 18/346,892

(22) Filed: Jul. 5, 2023

(65) Prior Publication Data
US 2023/0367683 A1 Nov. 16, 2023

Related U.S. Application Data (63) Continuation of application No. PCT/CN2023/083028, filed on Mar. 22, 2023.

(30) Foreign Application Priority Data

Dec. 30, 2022 (CN) .......................... 202211730622.0

(51) Int. Cl.
*G06F 11/00* (2006.01)
*G06F 11/20* (2006.01)
(Continued)

(52) U.S. Cl.
CPC .......... *G06F 11/27* (2013.01); *G06F 11/2007* (2013.01); *G06F 11/221* (2013.01); *G06F 13/4282* (2013.01)

(58) Field of Classification Search
CPC ............... G06F 11/2007; G06F 11/221; G06F 11/27–277
See application file for complete search history.

(56) References Cited

U.S. PATENT DOCUMENTS

2011/0006794 A1 1/2011 Sellathamby et al.
2013/0097460 A1* 4/2013 Jeong ................... G11C 29/022
714/37
(Continued)

FOREIGN PATENT DOCUMENTS

CN 1511285 A 7/2004
CN 102567168 A 7/2012
(Continued)

*Primary Examiner* — Michael Maskulinski
(74) *Attorney, Agent, or Firm* — Bayramoglu Law Offices LLC (57) ABSTRACT An apparatus and a method for testing a multi-channel high-speed low-latency interconnect interface (HLII) for a silicon interposer are provided. The apparatus includes: a standard test port configured to exchange a test instruction; an asynchronous bypass port configured to directly access an input/output (I/O) port of a channel of a physical layer of the interconnection interface; a built-in self-test (BIST) engine configured to implement inter-level loopback testing and data verification; a redundant data channel configured to repair a damaged data channel; and a delay chain testing circuit configured to test a function and linearity of a delay chain. The apparatus embeds test and repair logic into the physical layer and a link layer, achieving internal test control without any external controller. In this way, a sample can be tested and quickly screened to ensure its performance.

10 Claims, 4 Drawing Sheets (51) Int. Cl.
*G06F 11/22* (2006.01)
*G06F 11/27* (2006.01)
*G06F 13/42* (2006.01)

(56) References Cited

U.S. PATENT DOCUMENTS

| | | | | |
|---|---|---|---|---|
| 2019/0163596 A1* | 5/2019 | Eckert | .................... | G06F 11/277 |
| 2022/0138387 A1* | 5/2022 | Narayanun | ............ | G06F 30/394 |
| | | | | 716/103 |
| 2023/0063588 A1* | 3/2023 | Werhane | ............. | G06F 13/4282 |

FOREIGN PATENT DOCUMENTS

| | | | |
|---|---|---|---|
| CN | 112098803 A | | 12/2020 |
| EP | 1624465 A1 | | 2/2006 |

\* cited by examiner

APPARATUS AND METHOD FOR TESTING HIGH-SPEED LOW-LATENCY INTERCONNECT INTERFACE (HLII) FOR SILICON INTERPOSER

CROSS REFERENCE TO THE RELATED APPLICATIONS

This application is the continuation application of International Application No. PCT/CN2023/083028, filed on Mar. 22, 2023, which is based upon and claims priority to Chinese Patent Application No. 2022117306220, filed on Dec. 30, 2022, the entire contents of which are incorporated herein by reference.

TECHNICAL FIELD

The present disclosure relates to the technical field of semiconductors, and in particular, to an apparatus and a method for testing a high-speed low-latency interconnect interface (HUT) for a silicon interposer.

BACKGROUND

With the development of semiconductor technologies, a heterogeneous acceleration platform that needs to integrate a plurality of computing chiplets emerges for highly-intensive data processing. High-speed interconnection needs to be performed for different types of computing chiplets on a heterogeneous computing platform through a large quantity of input/output (I/O) ports. Therefore, a multi-channel high-speed interconnection interface for a silicon interposer comes into being.

In device manufacturing, a process deviation can easily cause a performance deviation of a sample. Because a high-speed interconnection interface often operates at a high frequency, a performance deviation caused by a process may cause a functional failure of a chip. Therefore, how to test and quickly screen a sample is an urgent problem to be resolved.

SUMMARY

Technical Problems

Because a high-speed interconnection interface often operates at a high frequency, a performance deviation caused by a process may cause a functional failure of a chip. Therefore, how to test and quickly screen a sample is an urgent problem to be resolved.

Technical Solutions

Based on this, to resolve the aforementioned technical problems, it is necessary to provide an apparatus and a method for testing an HLII for a silicon interposer, to achieve self-testing and self-repair.

According to a first aspect, the present disclosure provides an apparatus for testing a multi-channel HLII for a silicon interposer. The apparatus includes:
  a standard test port configured to exchange a test instruction;
  an asynchronous bypass port configured to directly access an I/O port of a channel of a physical layer of the interconnection interface;
  a built-in self-test (BIST) engine configured to implement inter-level loopback testing and data verification;
  a redundant data channel configured to repair a damaged data channel; and
  a delay chain testing circuit configured to test a function and linearity of a delay chain.

In an embodiment, the standard test port is disposed at the physical layer of the interconnection interface to exchange the standard test instruction, and includes:
  a serial test input port and a serial test output port.

In an embodiment, the asynchronous bypass port is disposed in the interconnection interface to directly access the I/O port of the interconnection interface within a chiplet.

According to a second aspect, the present disclosure further provides a method for testing an HLII for a silicon interposer. The method includes:
  testing a data channel between a transmitting-end chiplet and a receiving-end chiplet that are connected to the interconnection interface;
  testing a data channel inside a physical layer of the interconnection interface;
  testing a channel between the physical layer and a link layer of the interconnection interface;
  obtaining a damaged data channel based on a test result;
  performing remapping and repairing the damaged data channel;
  testing a function and linearity of a delay chain inside the interconnection interface; and
  testing quality of a data eye output by the interconnection interface.

In an embodiment, the data channel between the transmitting-end chiplet and the receiving-end chiplet that are connected to the interconnection interface is tested through a BIST.

In an embodiment, the data channel inside the physical layer of the interconnection interface is tested through a BIST; and
  the channel between the physical layer and the link layer of the interconnection interface is tested through the BIST.

In an embodiment, the step of testing the function and the linearity of the delay chain inside the interconnection interface includes:
  testing a zero delay, a delay step size, a maximum delay, and the linearity that are actually designed for the delay chain.

In an embodiment, the step of testing the zero delay, the delay step size, the maximum delay, and the linearity that are actually designed for the delay chain includes:
  exciting a self-excited oscillation clock by using a ring oscillator;
  recording a quantity of cycles of the self-excited oscillation clock within cycles of a plurality of clocks with known cycles, and estimating a cycle of the self-excited oscillation clock;
  obtaining a delay of the delay chain based on the cycle of self-excited oscillation clock; and
  calculating the delay of the delay chain through repeated iteration to obtain the zero delay, the delay step size, the maximum delay, and the linearity of the delay chain.

In an embodiment, the ring oscillation counter is constituted by the delay chain and a phase inverter.

In an embodiment, the step of testing the quality of the data eye output by the interconnection interface further includes:
  adjusting a reference voltage to test widths of the data eye under different reference voltages to obtain a two-dimensional data eye map output by the interconnection interface.

Beneficial Effects

According to the apparatus and the method for testing an HLII for a silicon interposer, a plurality of standard test ports configured to exchange a standard test instruction, an asynchronous bypass port configured to directly access an I/O port of a channel of a physical layer of the interconnection interface, a BIST engine configured to implement inter-level loopback testing and data verification, a redundant data channel configured to repair a damaged data channel, and a delay chain testing circuit configured to test a function and linearity of a delay chain are disposed. Based on the testing apparatus of the present disclosure, channel repair and testing can be conducted internally, test and repair logic can be embedded into the physical layer and a link layer, and almost all required tests can be executed internally without any external controller. According to the present disclosure, a sample can be tested and quickly screened to ensure its performance.

BRIEF DESCRIPTION OF THE DRAWINGS

To describe the technical solutions in the embodiments of the present disclosure or in the conventional art more clearly, the following briefly describes the accompanying drawings required for describing the embodiments or the conventional art. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

To enable the above objectives, features, and advantages of the present disclosure to be more apparent and easily understood, specific implementations of the present disclosure will be described in detail below in conjunction with the accompanying drawings. The following describes many details in order to provide a thorough understanding of the present disclosure. However, the present disclosure can be implemented in many other ways other than those described herein, and those skilled in the art can make similar improvements without departing from the connotation of the present disclosure, and thus the present disclosure is not limited to the specific embodiments disclosed below.

It should be understood that in the description of the present disclosure, terms such as "first" and "second" are used merely for a descriptive purpose, and should not be construed as indicating or implying relative importance, or implicitly indicating a quantity of indicated technical features. Therefore, a feature limited by "first" or "second" may explicitly or implicitly include at least one such feature. In the descriptions about the present disclosure, "a plurality of" means at least two, for example, two or three, unless otherwise specifically limited.

In the present disclosure, unless otherwise clearly specified and limited, the terms "installation", "interconnection", "connection" and "disposition" etc. are intended to be understood in a broad sense. For example, the "connection" may be a fixed connection, a removable connection or an integral connection; may be a mechanical connection or an electrical connection; may be a direct connection or an indirect connection using a medium; or may be a communication or an interaction between two elements. Those of ordinary skill in the art may understand specific meanings of the above terms in the present disclosure based on a specific situation.

In the present disclosure, unless otherwise clearly specified and limited, when it is described that a first feature is "above" or "below" a second feature, it indicates that the first and second features are in direct contact or the first and second features are in indirect contact through a medium. In addition, when it is described that the first feature is "over", "above" and "on" the second feature, it indicates that the first feature is directly or obliquely above the second feature, or simply indicates that an altitude of the first feature is higher than that of the second feature. When it is described that the first feature is "under", "below" or "beneath" the second feature, it indicates that the first feature is directly or obliquely under the second feature or simply indicates that an altitude of the first feature is lower than that of the second feature.

It should be noted that when a component is "fixed" or "provided" on another component, the component may be fixed on the another component directly or via an intermediate component. When a component is connected to another component, the component may be connected to the another component directly or via an intermediate component. The terms "vertical", "horizontal", "upper", "lower", "left", "right" and other similar expressions used herein are for illustrative purposes only, rather than to mean the only implementation.

With the rise of artificial intelligence (AI) and big data, a traditional central processing unit (CPU) computing platform is no longer able to meet highly-intensive data applications. A heterogeneous acceleration platform that integrate a plurality of computing chiplets such as CPU/graphics processing unit/field-programmable gate array (FPGA)/AI accelerators emerges. Different types of computing chiplets on a heterogeneous computing platform need to be interconnected at a high speed through a large quantity of I/O ports. This cannot be met through traditional printed circuit board (PCB) substrate interconnection or system in a package (SIP) interconnection, so a special HLII needs to be used on a silicon medium to interconnect the chiplets. In addition, a high bandwidth memory (HBM) oriented to highly-intensive data applications also needs to be interconnected with the computing chiplets by using a multi-channel HLII at a silicon interposer.

In an embodiment, a testing apparatus is provided. The apparatus can test an HLII to analyze and repair a damaged data path between a transmitting-end chiplet and a receiving-end chiplet. The apparatus is embedded with test and repair logic, and can be directly used to perform testing without any external controller.

In an embodiment, the apparatus includes: a standard test port configured to exchange a test instruction; an asynchronous bypass port configured to directly access an I/O port of a channel of a physical layer of the interconnection interface; a BIST engine configured to implement inter-level loopback testing and data verification; a redundant data channel configured to detect whether a channel is damaged and repair a damaged data channel; and a delay chain testing circuit configured to test a function and linearity of a delay chain.

Figure 1:
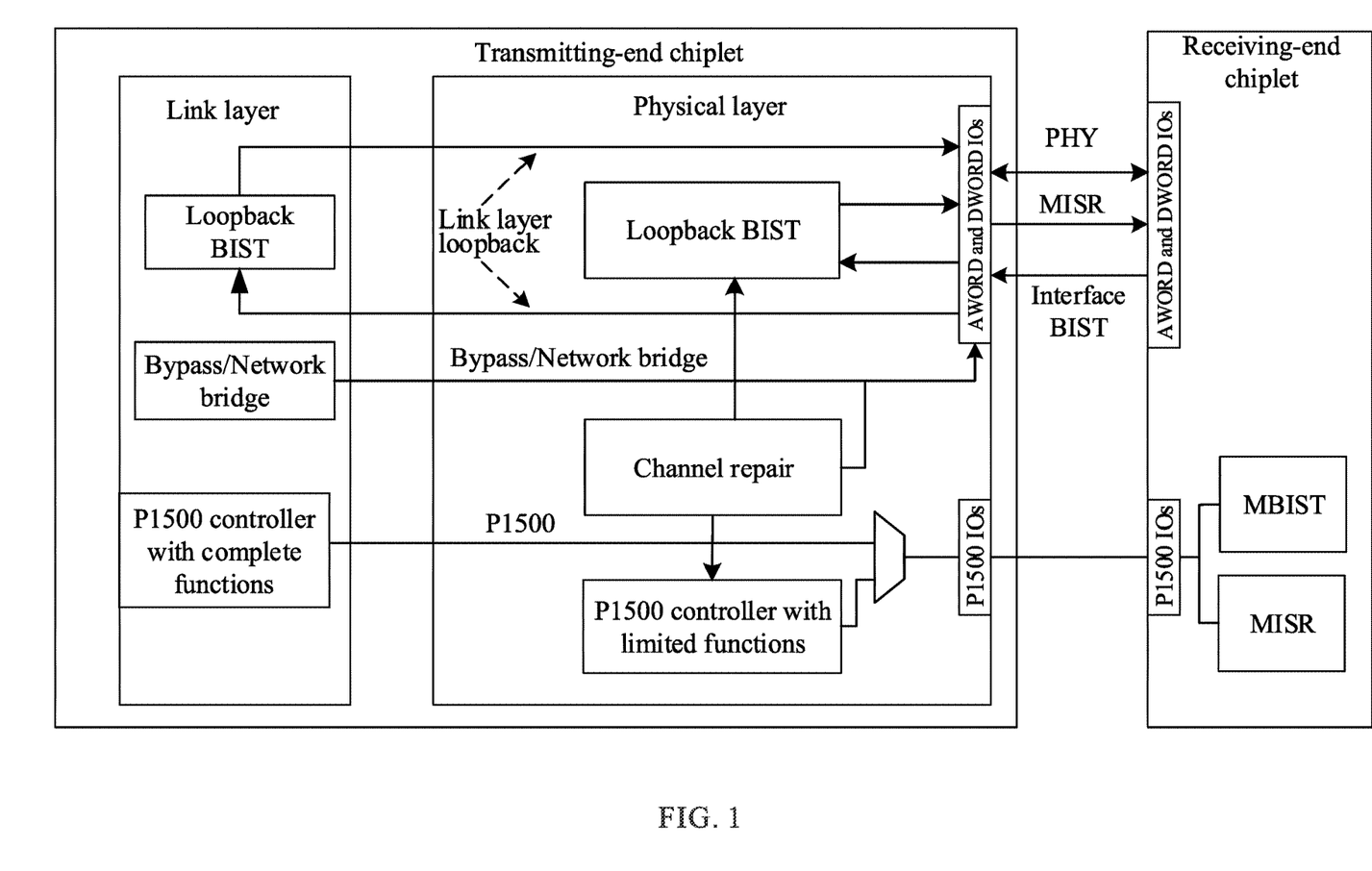
FIG. 1 shows a top-level test architecture of a testing apparatus according to an embodiment.

FIG. 1 shows a top-level test architecture of an apparatus for testing an HLII for a silicon interposer according to an embodiment. As shown in FIG. 1, this interconnection interface is configured to connect a transmitting-end chiplet and a receiving-end chiplet, and includes a link layer and a physical layer. A P1500 controller is disposed at both the link layer and the physical layer. A loopback BIST is disposed between the link layer and the physical layer, and inside the physical layer. The physical layer is further provided with a redundant channel for channel repair, as well as a plurality of test interfaces.

The testing apparatus provided in this embodiment is illustrated by taking a multi-channel HLII for a silicon interposer as an example. The test and repair logic of the testing apparatus is disposed at the physical layer and the link layer of the HLII. The HLII allows an external controller at the physical layer and the link layer to perform testing and repair operations. In addition to an optional loopback BIST at the link layer, all required tests can be executed at the physical layer independently of the external controller.

In an embodiment, the standard test port is disposed at the physical layer of the interconnection interface to exchange the standard test instruction, and includes a serial test input port and a serial test output port.

For example, a test port is disposed at the link layer of the interconnection interface. The test port may be a test port in compliance with an IEEE 1500 standard, and is used by the HLII to transmit a P1500 instruction to another chiplet. For the link layer, the test port is a pass-through interface at the physical layer. The HLII may be controlled by either the P1500 controller inside the physical layer or an additional P1500 controller designed at the link layer.

In this embodiment, the test port in compliance with the IEEE 1500 standard is used for functional testing, and uses an asymmetric wrapper serial port (WSP), a separate wrapper serial input (WSI) port (serial test input port), and a wrapper serial output (WSO) port (serial test output port) of each channel. Within the physical layer, all WSP port signals including WRST_n and WRCK are driven by an embedded microcontroller (MCF).

Figure 2:
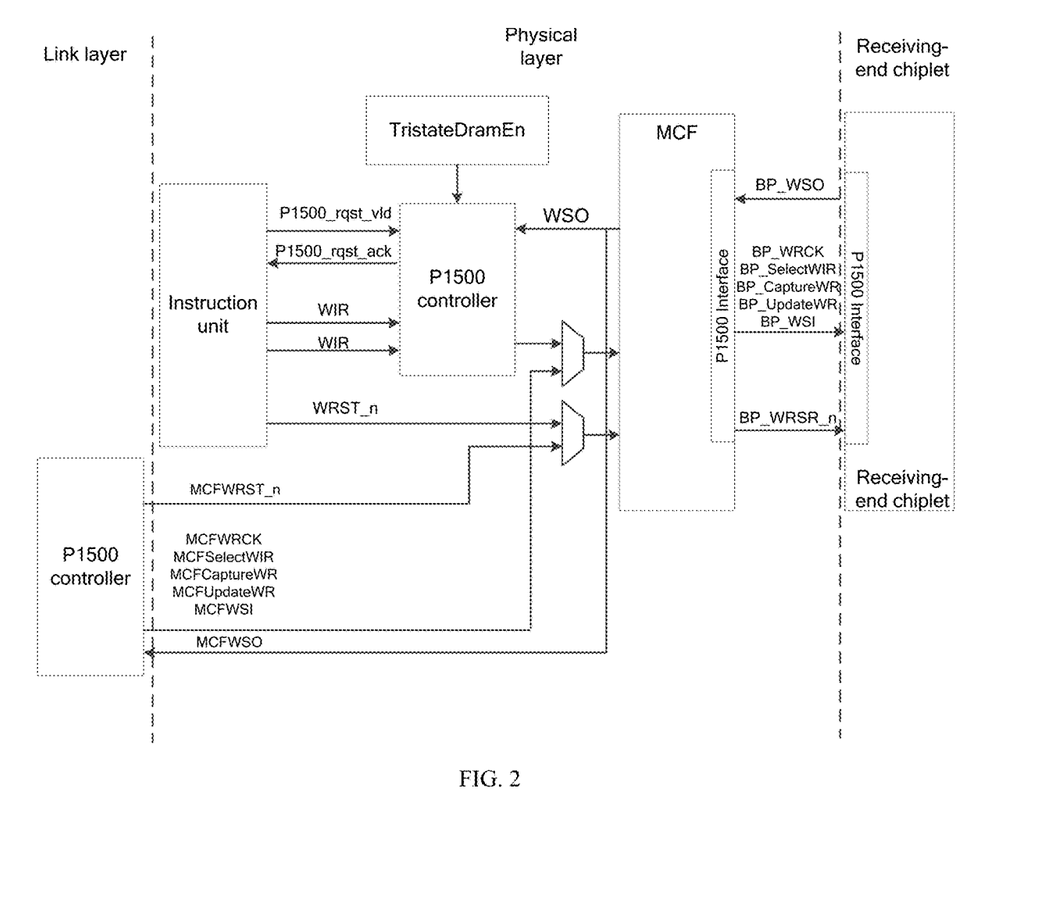
FIG. 2 is a block diagram of a top-level design of a delay line according to an embodiment.

FIG. 2 shows a top-level architecture of a delay chain design. In the figure, the MCF is connected to and drives a P1500 port, including the clock signal WRCK and the reset signal WRST_n. As shown in FIG. 2, the MCF is connected to both the P1500 controller inside the physical layer and the P1500 controller at the link layer. During testing, the P1500 port may be controlled by either the P1500 controller inside the physical layer or the P1500 controller at the link layer.

When an internal engine using the P1500 instruction is activated or undergoes channel repair, the physical layer of the apparatus takes over an MCF pin used for WSP signal transmission. The physical layer drives the WRST_n as a high level by default, unless the WRST_n is set as a valid command and emitted. The WRCK remains a state of being 0 constantly and does not flip unless the embedded P1500 controller is triggered to send a supported command.

The BIST engine of the HLII testing apparatus in this embodiment is configured to achieve a BIST, including an interface BIST and the loopback BIST.

The interface BIST of the physical layer tests and trains an interface between the transmitting-end chiplet and the receiving-end chiplet by using a command from a built-in testing architecture. For example, a data path between the transmitting-end chiplet and the receiving-end chiplet is repaired, or a timing sequence of data transmission is trained and optimized.

The loopback BIST of the physical layer is used to test an internal path of the physical layer, and internal logic of the physical layer generates a data pattern, and drives and receives data through the I/O port.

The loopback BIST of the link layer is used to test a channel between the link layer and the physical layer, and data generation and data comparison during channel testing are completed by the link layer.

In an embodiment, the asynchronous bypass port is disposed in the interconnection interface to directly access the I/O port of the interconnection within the chiplet.

For example, the asynchronous bypass interface allows the link layer to directly access a channel port DWORD I/O at the physical layer. The I/O port can serve as an interface of the chiplet. During a scanning test on an EXTEST boundary, the link layer can send data to an I/O port of the data channel through the asynchronous bypass interface, or receive data from an I/O port of the data channel through the asynchronous bypass interface.

Figure 3:
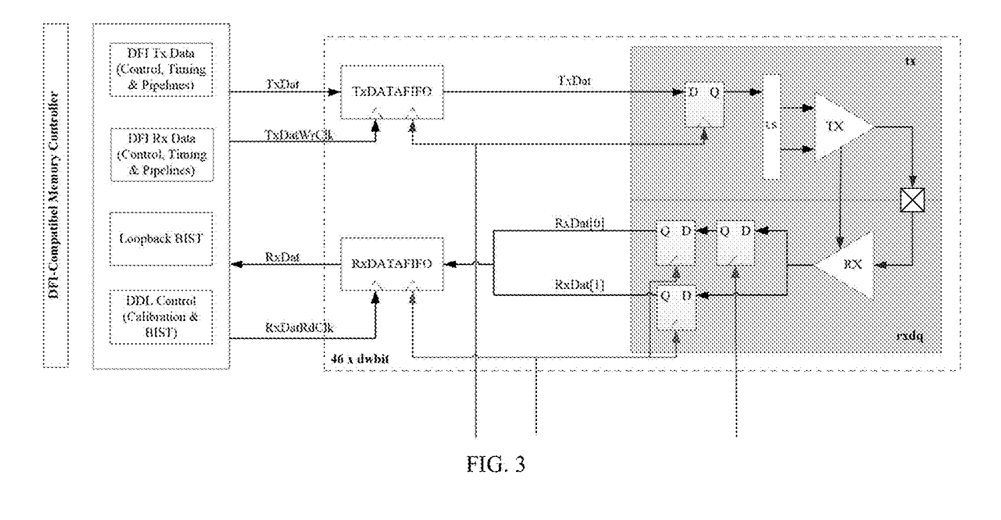
FIG. 3 is a schematic structural diagram of a multiple-input shift register (MISR) according to an embodiment.

FIG. 3 is a schematic structural diagram of an MISR according to an embodiment. In a data loopback architecture shown in FIG. 3, during data reading and writing, a selected data pattern is sent through a data task patten sending path, and is looped back through a task patten receiving path of each signal.

Because both a reading strobe signal WDQS and a writing strobe signal RDQS are unidirectional signals, dedicated built-in loopback receiving and sending paths are disposed at the physical layer to loop back these two signals. Each channel of the data channel has an error state, and once an error is detected in the channel, the error state is "viscous". The error status of each channel is stored in an error status bit register. There is an overall error counter in a data word (DWORD) of the data channel. Whenever an error occurs on any channel of a DWORD byte, a value of the error counter increases, and the error counter is recorded in a corresponding register. When a maximum value is reached, the value of the error counter stops increasing.

The apparatus for testing a multi-channel HLII for a silicon interposer in this embodiment is provided with a plurality of standard test ports configured to perform a functional test, an asynchronous bypass port configured to access an I/O port of a channel of a physical layer of the interconnection interface, a BIST engine configured to implement a BIST, a redundant data channel configured to perform remapping and repair a damaged data channel, and a counter configured to perform a delay test. Test and repair logic is embedded into the physical layer and a link layer. In this way, a sample can be tested and quickly screened to ensure its performance.

In an embodiment, a method for testing a multi-channel HLII for a silicon interposer is provided, and includes: testing a data channel of the interconnection interface, testing a function and linearity of a delay chain inside the interconnection interface, and testing quality of a data eye output by the interconnection interface.

The HLII identifies and repairs a damaged data channel by using an IEEE1500 instruction. The interconnection interface can perform all repair and remapping functions on its own, repair a built-in hardware channel of the HLII, and automatically repair most data channels without any external control logic.

When a DWORD of the data channel is tested and repaired, a redundant data channel is designed in the data channel to repair another data channel, so as to increase a data flux when a short circuit or an open circuit occurs on a micro convex point or a data path is damaged.

When the data channel is repaired, if the damaged channel is remapped and repaired, once the data channel of the HLII is identified and remapped, relevant information needs to be programmed into a register of a configuration control block (CCB). Therefore, the CCB can optionally be rerouted to a required redundant data channel. For a damaged pin that has been identified, the HLII enables it to achieve a three-state output.

In this embodiment, a main control finite-state machine (FSM) is responsible for an order of each data channel repair step by using a control state machine for data channel repair and independent data channel testing, repair, and remapping mechanisms. Each BIST engine has a state machine and AND/OR logic to execute data channel testing, analysis, repair, and remapping algorithms.

Figure 4:
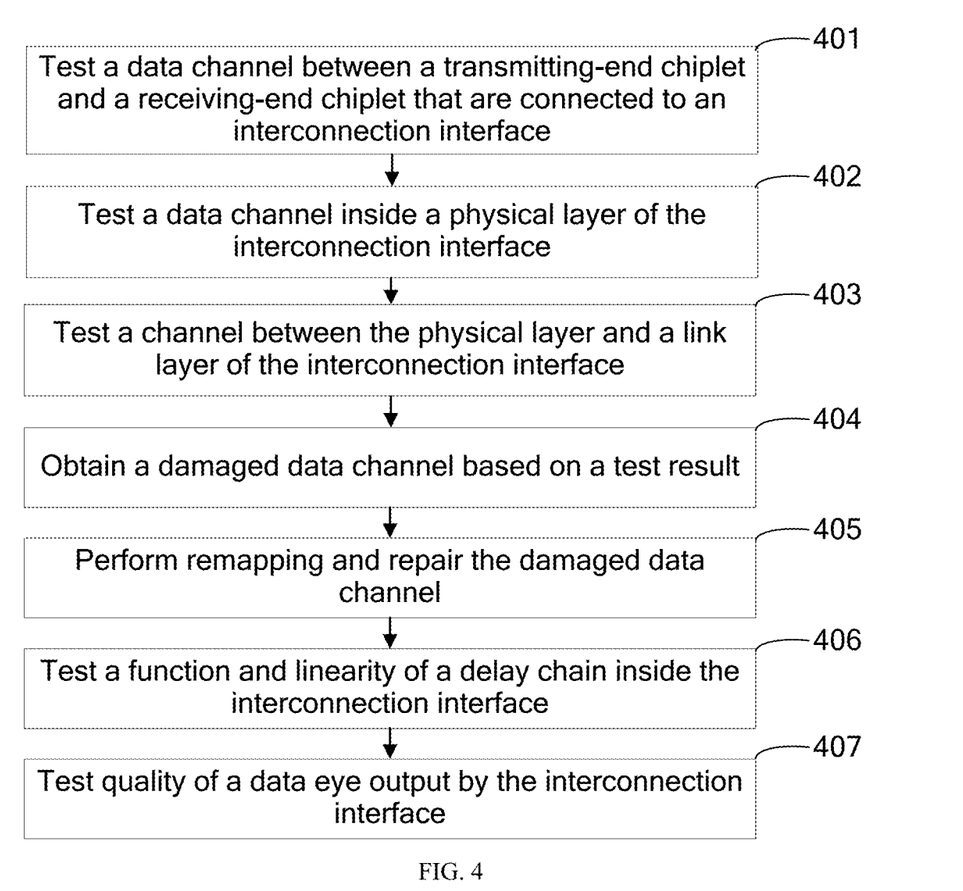
FIG. 4 is flowchart of a testing method according to an embodiment.

The data channel repair and remapping functions provided in this embodiment are used to test, analyze, and repair the data damaged channel of the HLII. FIG. 4 is a flowchart of a method for testing an HLII for a silicon interposer according to an embodiment. The method includes following steps.

Step 401: A data channel between a transmitting-end chiplet and a receiving-end chiplet that are connected to the interconnection interface is tested.

The data channel between the transmitting-end chiplet and the receiving-end chiplet that are connected to the HLII is tested through a BIST.

Step 402: A data channel inside a physical layer of the interconnection interface is tested.

The data channel inside the physical layer of the interconnection interface is tested through a loopback BIST at the physical layer.

Step 403: A channel between the physical layer and a link layer of the interconnection interface is tested.

The channel between the physical layer and the link layer of the interconnection interface is tested through the loopback BIST at the link layer.

Step 404: A damaged data channel is obtained based on a test result.

Step 405: Remapping is performed and the damaged data channel is repaired.

The data channel is repaired based on a disposed redundant data channel. The data channel is completely repaired after all enabled data channel repairs have been executed.

Step 406: A function and linearity of a delay chain inside the interconnection interface are tested.

In this embodiment, the function and the linearity of the delay chain inside the interconnection interface can also be tested. The test on the function and the linearity of the delay chain includes: testing a zero delay, a delay step size, a maximum delay, and the linearity that are actually designed for the delay chain.

Step 407: Quality of a data eye output by the interconnection interface is tested.

This embodiment can also train the data eye, draw and output an obtained data eye, and analyze the quality of the data eye based on a data eye map.

In this embodiment, when the data channel is repaired, a data channel repair control state machine is used to control execution of an I/O signal line repair process. Once the Hill internally issues a data channel repair instruction, the data channel repair control state machine sequentially executes a repair step for each data channel based on whether a special step is enabled in a relevant configuration. These repair steps include EXTEST connectivity testing, loopback BIST testing, MISR high-speed testing, and data channel remapping.

The MISR high-speed testing is conducted only when no damaged data channel is found during EXTEST and BIST loopback stages. Built-in data channel repair needs to be triggered after the HLII is initialized. A completion status and an error of each channel repair are captured by an internal status register, and a status of the data channel repair can be observed by using the internal status register.

In this embodiment, once the HLII is in a loopback mode, a data pattern for testing can be generated either on a built-in loopback BIST engine at the physical layer or by the link layer and software. A loopback process includes following steps.

(A1): Initialization is performed.

The initialization of the loopback BIST includes starting a main power supply voltage for digital circuits in HLII, including transmitter and receiver circuits (VDD), a power supply voltage for an analog circuit (VAA), and a power supply voltage for an output driver circuit (VDDQ) through the initialization. In addition, a clock is started and the HLII is reset through the initialization.

(A2): A loopback frequency is set.

A system clock of the HLII is locked to a required loopback frequency.

(A3): The data pattern is sent, and verification is performed.

A loopback path of the interconnection interface is enabled, and the data pattern is sent. Then the data pattern passing through the loopback path is checked and verified.

The data pattern is looped back within an I/O before a PAD (physical layer core side, in the case of loopback without passing through PAD) or after the PAD (in the case of loopback passing through the PAD). The loopback path uses a data transmitter used in a path in a normal working mode. For a receiving path, a data receiver used in the normal working mode is used to receive data. The data transmitter is represented as TX and the data receiver is represented as RX. In addition, depending on whether to perform loopback within the physical layer or loopback from the link layer to the physical layer, the data pattern can be sent and verified by a pattern generator and a pattern checker at the physical layer or the link layer of the Hill.

In an embodiment, that the zero delay, the delay step size, the maximum delay, and the linearity that are actually designed for the delay chain includes: exciting a self-excited oscillation clock by using a ring oscillator; recording a quantity of cycles of the self-excited oscillation clock within cycles of a plurality of clocks with known cycles, and estimating a cycle of the self-excited oscillation clock; obtaining a delay of the delay chain based on the cycle of the self-excited oscillation clock; and calculating the delay of the delay chain through repeated iteration to obtain the zero delay, the delay step size, the maximum delay, and the linearity of the delay chain.

The apparatus for testing a multi-channel HUT for a silicon interposer in this embodiment can further achieve delay chain testing to test a minimum delay and the linearity of the delay chain. The delay chain testing is used to test that linear time of the delay chain changes with a delay configuration, namely, the minimum delay and the delay step size. An important feature of delay chain testing logic is that a clock that is generated by a PLL and whose cycle is one UI is not used.

Usually, the delay provided by the delay chain can be represented by the delay step size and a quantity of delay steps, namely:

Delay of the delay chain=(dly_sel*stepsize)+zerodelay

In the above formula, zerodelay, namely, a time constant of the delay chain, represents the minimum delay of the delay chain, and stepsize represents the delay step size of the delay chain. These two parameters are dependent on a preparation process and vary with an application environment, a manufacture procedure, a temperature, and a voltage. The delay chain testing is intended to obtain these two parameters. In addition, dly_sel is digitally encoded data and used to represent the quantity of delay steps of the delay chain.

As described above, delay testing in this embodiment requires two counters. A first counter is a down-counter driven by the system clock, and a second counter is a ring oscillation counter driven by an output clock of a ring oscillator constituted by one delay chain and one phase inverter.

During the delay chain testing, a cycle of the ring oscillator is represented as twice the delay of the delay chain. A linearity test of the delay chain in this embodiment is intended to test the minimum delay and the linearity of the delay chain. It can be obtained that the cycle of the ring oscillator (Tro) is linearly related to the quantity of delay steps of the delay chain (dly_sel), which is represented as follows:

$$Tro = a*dly\_sel + b$$

Although the cycle of the ring oscillator is linearly related to the delay of the delay chain, there is still a certain tolerance due to the non-ideal linearity of the delay chain. An obtained sample set is fitted using a least mean square method.

Running time of testing a single delay step size can be expressed as follows:

$$running\ time = count\ value\ of\ the\ ring\ oscillation\ counter\ (Nup) \times cycle\ of\ the\ ring\ oscillator\ (Tro)$$

$$= system\ clock\ cycle\ (Tclk) \times count\ value\ of\ the\ down\text{-}counter\ (Ndown)$$

The above formula is transformed to obtain a following formula:

$$a*dly\_sel + b = (Tclk \times Ndown)/Nup$$

It can be obtained that the only parameters a and b of a linear function are needed to calculate the quantity of delay steps, namely, the dly_sel.

The quantity of delay steps is obtained through iterative calculation. During the calculation, it is allowed to have a certain deviation in a sampled count value of the ring oscillation counter. One iteration during the testing includes following steps:

(B1): Initialization is performed.

The quantity of delay steps, namely, the dly_sel, is initialized to zero.

The count value of the ring oscillation counter is reset, the down-counter is initialized, and an initial value of the down-counter is set.

(B2): The counter starts counting.

First, the down-counter starts counting downwards.

After the down-counter is returned to zero, a value of the ring oscillation counter is recorded. When the value of the ring oscillation counter is recorded, the ring oscillation counter is sampled twice, and count values of the two samples are recorded.

There is an error in a final value of the ring oscillation counter because the step size of the dly_sel is not normalized.

(B3): The delay step size is calculated based on the count value of the counter.

In units of ps, stepsize_i between dly_sel=i and dly_sel=ji+1 can be calculated according to following formulas:

$$PeriodRO\_i = system\ clock\ cycle \times count\ value\ of\ the\ down\text{-}counter/[count\ value\ of\ the\ ring\ oscillation\ counter\ in\ step\ i\text{-}4];$$

$$PeriodRO\_j = system\ clock\ cycle \times count\ value\ of\ the\ down\text{-}counter/[count\ value\ of\ the\ ring\ oscillation\ counter\ in\ step\ j\text{-}4];\ and$$

$$stepsize\_ji = (PeriodRO\_j - PeriodRO\_i)/2$$

Because clocks of the down-counter and the ring oscillation counter are out of synchronization, there may be an error when the counter calculates a final delay step size. The error of the delay step size in this embodiment can be guaranteed to be within 0.1 ps, which is equivalent to minimum test time that can be met. Therefore, high accuracy is achieved.

In an embodiment, that the quality of the data eye output by the interconnection interface is tested includes: adjusting a reference voltage to test widths of the data eye under different reference voltages to obtain a two-dimensional data eye map output by the interconnection interface.

The apparatus for testing a multi-channel HUT for a silicon interposer in this embodiment can further achieve two-dimensional data eye scanning. The two-dimensional data eye scanning can be automatically performed on a basis of built-in training. In data eye training, there is a status register configured to record an eye width, and the status register provides positions of left and right edges of an eye. The quality of the data eye can be intuitively obtained through the two-dimensional data eye scanning.

For example, the two-dimensional data eye scanning in this embodiment includes following steps:

(C1): A start voltage is set.

(C2): A reference test voltage is set, and the two-dimensional data eye scanning is performed under a test voltage.

The test voltage is set from the start voltage.

The data eye training is triggered under the test voltage, the status register inside the interconnection interface is polled, completion of the training is waited for, and a data eye scanning signal is obtained after the data eye training. A specific data eye training method is not limited. A delay value may be set to repeatedly obtain data during sampling, so as to further identify the data eye based on a sampling area, or the data eye training may be performed according to another method. This embodiment has no restriction on the data eye training method.

A reading register is used to check for a training error and check left and right boundaries of the data eye, to ensure that a complete data eye signal is obtained.

After the two-dimensional data eye scanning under a current voltage is completed, if the test voltage has not yet reached a maximum voltage, the test voltage is increased to conduct the data eye training again, and the data eye is read after the training.

(C3): The data eye is analyzed and drawn.

All read data eye signals can be output through depiction. The quality of the data eye is analyzed based on the obtained data eye map.

In this embodiment, the two-dimensional data eye scanning can depict both a data eye passing through the PHY- DRAM interface and a data eye only passing through an internal loopback path of the physical layer.

It should be understood that although the steps in the flowcharts in the above embodiments are shown in sequence as indicated by the arrows, these steps are not necessarily performed in sequence as indicated by the arrows. The execution order of these steps is not strictly limited, and these steps may be executed in other orders, unless clearly described otherwise. Moreover, at least some of the steps in the flowcharts in the above embodiments may include a plurality of steps or stages. The steps or stages are unnecessarily executed at the same time, but may be executed at different times. The execution order of the steps or stages is unnecessarily carried out sequentially, but may be executed alternately with other steps or at least some of the steps or stages of other steps.

Unless otherwise defined, all technical and scientific terms used herein have the same meanings as commonly understood by those skilled in the technical field of the present disclosure. The terms used in the specification of the present disclosure are merely for the purpose of describing specific embodiments, rather than to limit the present disclosure. The term "and/or" used herein includes any and all combinations of one or more related items listed.

It should also be understood that the terms such as "including/comprising" and "having" indicate the existence of the stated features, wholes, steps, operations, components, parts or combinations thereof. However, these terms do not exclude the possibility of the existence of one or more other features, wholes, steps, operations, components, parts or combinations thereof.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

The above embodiments are merely illustrative of several implementations of the present disclosure, and the description thereof is more specific and detailed, but is not to be construed as a limitation to the patentable scope of the present disclosure. It should be noted that those of ordinary skill in the art can further make variations and improvements without departing from the conception of the present disclosure. These variations and improvements all fall within the protection scope of the present disclosure. Therefore, the protection scope of the present disclosure should be subject to the protection scope defined by the claims.

What is claimed is:

1. An apparatus for testing a high-speed low-latency interconnect interface (HLII) for a silicon interposer, comprising:
    a standard test port configured to exchange a standard test instruction;
    an asynchronous bypass port configured to directly access an input/output (I/O) port of a channel of a physical layer of the HLII;
    a built-in self-test (BIST) engine configured to implement an inter-level loopback testing and a data verification;
    a redundant data channel configured to repair a damaged data channel; and
    a delay chain testing circuit configured to test a function and a linearity of a delay chain.

2. The apparatus according to claim 1, wherein the standard test port is disposed at the physical layer of the HLII to exchange the standard test instruction, and comprises:
    a serial test input port and a serial test output port.

3. The apparatus according to claim 1, wherein the asynchronous bypass port is disposed in the HLII to directly access the I/O port of the HLII within a chiplet.

4. A method for testing an HLII for a silicon interposer, comprising:
    testing a data channel between a transmitting-end chiplet and a receiving-end chiplet, wherein the transmitting-end chiplet and the receiving-end chiplet are connected to the HLII;
    testing a data channel inside a physical layer of the HLII;
    testing a channel between the physical layer and a link layer of the HLII;
    obtaining a damaged data channel based on a test result;
    remapping and repairing the damaged data channel;
    testing a function and a linearity of a delay chain inside the HLII; and
    testing a quality of a data eye output by the HLII.

5. The method according to claim 4, wherein the data channel between the transmitting-end chiplet and the receiving-end chiplet is tested through a BIST.

6. The method according to claim 4, wherein the data channel inside the physical layer of the HLII is tested through a BIST; and
    the channel between the physical layer and the link layer of the HLII is tested through the BIST.

7. The method according to claim 4, wherein the step of testing the function and the linearity of the delay chain inside the HLII comprises:
    testing a zero delay, a delay step size, a maximum delay, and the linearity, wherein the zero delay, the delay step size, the maximum delay, and the linearity are actually designed for the delay chain.

8. The method according to claim 7, wherein the step of testing the zero delay, the delay step size, the maximum delay, and the linearity comprises:
    exciting a self-excited oscillation clock by using a ring oscillator;
    recording a quantity of cycles of the self-excited oscillation clock within cycles of a plurality of clocks with known cycles, and estimating a cycle of the self-excited oscillation clock;
    obtaining a delay of the delay chain based on the cycle of the self-excited oscillation clock; and
    calculating the delay of the delay chain through a repeated iteration to obtain the zero delay, the delay step size, the maximum delay, and the linearity of the delay chain.

9. The method according to claim 8, wherein a ring oscillation counter is constituted by the delay chain and a phase inverter.

10. The method according to claim 4, wherein the step of testing the quality of the data eye output by the HLII comprises:
    adjusting a reference voltage to test widths of the data eye under different reference voltages to obtain a two-dimensional data eye map output by the HLII.

* * * * *